United States Patent [19]

Shalvi et al.

[11] Patent Number: 5,283,813
[45] Date of Patent: Feb. 1, 1994

[54] METHODS AND APPARATUS PARTICULARLY USEFUL FOR BLIND DECONVOLUTION

[75] Inventors: Ofir Shalvi, Ramat Hasharon; Ehud Weinstein, Ramat Gan, both of Israel

[73] Assignee: Ramat University Authority for Applied Research & Industrial Development Ltd., Tel-Aviv, Israel

[21] Appl. No.: 834,092

[22] Filed: Feb. 12, 1992

[30] Foreign Application Priority Data

Feb. 24, 1991 [IL] Israel ............................ 97345

[51] Int. Cl.$^5$ ............................................. H03H 7/30
[52] U.S. Cl. ........................................ 375/12; 375/14; 364/724.01
[58] Field of Search ............... 375/12, 11, 15, 14; 364/724.01, 728.01

[56] References Cited

U.S. PATENT DOCUMENTS

| | | | |
|---|---|---|---|
| 4,688,198 | 8/1987 | Wiggins | 364/819 |
| 5,068,873 | 11/1991 | Murakami | 375/14 |
| 5,121,415 | 6/1992 | Goodman et al. | 375/14 |

OTHER PUBLICATIONS

Goddard D. N.: IEEE Transactions on Communications, vol. 28, No. 11, Nov. 1980, New York, pp. 1867-1875.
Shalvi O. and Weinstein E.: IEEE Transactions on Information Theory, vol. 36, No. 2, Mar. 1990, New York, pp. 312-321.
Shalvi O. and Weinstein E.: Proceedings of the SPIE—The International Society for Optical Engineering—Adaptive Signal Processing, Jul. 22-24, 1990, San Diego, Calif., vol. 1565, pp. 143-152.

Primary Examiner—Curtis Kuntz
Assistant Examiner—T. Ghebretinsae
Attorney, Agent, or Firm—Benjamin J. Barish

[57] ABSTRACT

A method and apparatus for controlling an equalizer receiving the output of an unknown system in order to produce a desired response for recovering the input to the system are characterized by iteratively adjusting the equalizer such that the unknown system combined with the equalizer behaves essentially as a linear system whose (t,n) taps, for some combinations of t and n, are iteratively adjusted according to the following rule:

$$s_{t,n}' = \sum_{i=1}^{I} a_i s_{t,n}^{p_i}(s_{t,n}^*)^{q_i}$$

where $s_{t,n}$ denotes the (t,n) tap before the iteration, $s'_{t,n}$ denotes the (t,n) tap after the iteration, I is a preselected integer greater then or equal to one, $a_i$ i=1,2 ... I are preselected scalars that may vary from iteration to iteration, and $p_i$, $q_i$ i=1,2, ... I are preselected non-negative integers such that $p_i+q_i \geq 2$.

19 Claims, 7 Drawing Sheets

BLIND EQUALIZER ADJUSTMENT ALGORITHM

METHODS AND APPARATUS PARTICULARLY USEFUL FOR BLIND DECONVOLUTION

FIELD AND BACKGROUND OF THE INVENTION

The present invention relates to methods and apparatus particularly useful for performing a blind deconvolution operation, e.g. for controlling an adjustable linear filter (sometimes called an equalizer) receiving the output of an unknown system in order to produce a desired response for recovering (deconvolving) the input to the system.

The problem of blind deconvolution, as illustrated in FIG. 1 of the drawings, arises when there is an unknown system having an output which is observed, but whose input is unobserved. In such a system it is desired to recover (deconvolve) the input by identifying the inverse of the unknown system. This is done by using an adjustable linear filter (sometimes called an equalizer) which is adjusted to recover, or deconvolve, the input up to a constant shift (delay), and possibly a constant phase or a sign ambiguity.

The problem of blind deconvolution is of considerable interest in many fields of engineering and applied science. For example, in data communication, the unobserved input is a transmitted sequence of data symbols (bits), and the unknown system represents the distortion in the transmission channel (e.g., a telephone line) which causes the undesirable phenomena of inter symbol interference (ISI). The equalizer (adjustable linear filter) in this case attempts to recover the transmitted sequence (i.e., the message) by canceling, or inverting, the distortion caused by the channel.

A similar problem occurs in image restoration or reconstruction, wherein the unobserved input is the original image (scene), and the unknown system represents the imperfections in the electronic or photographic medium which essentially causes blurring effects. The equalizer (adjustable linear filter) in this case attempts to reconstruct the original image by de-blurring, that is canceling the imperfections in the image formation system. This problem is particularly important in fields such as astronomy, remote sensing, and medical imaging, where the blurs cause a severe degradation in the quality and resolution of the observed image. Similar deconvolution problems can be found in the analysis of geophysical signals, in underwater acoustics, and the like.

SUMMARY OF THE INVENTION

According to the present invention there is provided a method for controlling an equalizer to be coupled to an unknown system having an input and an output which equalizer receives the output of the unknown system in order to produce a desired response for recovering the input to said system, characterized by iteratively adjusting the equalizer such that the unknown system combined with the equalizer behaves essentially as a linear system whose (t, n) taps, for some combinations of t and n, are iteratively adjusted according to the following rule:

$$s_{t,n}' = \sum_{i=1}^{I} a_i s_{t,n}^{p_i} (s_{t,n}^*)^{q_i}$$

where $s_{t,n}$ denotes the (t, n) tap before the iteration, $s'_{t,n}$ denotes the (t, n) tap after the iteration, I is a preselected integer greater than or equal to one, $a_i, i=1,2 \ldots I$ are preselected scalars that may vary from iteration to iteration, and $p_i, q_i, i=1,2,\ldots I$ are preselected non-negative integers such that $p_i + q_i \geq 2$.

As will be described more particularly below, the present invention involves a new class of iterative deconvolution methods that converge very fast to the desired solution in which the inverse of the unknown system is identified, and the input is recovered. These methods are computationally efficient and statistically stable. They are capable of identifying both the magnitude and the phase of the unknown system transfer function, as distinguished from the known linear prediction methods that are incapable of identifying the phase. Another important feature of the proposed methods is that they do not suffer from spurious/ambiguous solutions, and they always converge to the desired response. Error analysis indicates that in many cases the method of the present invention is superior to linear prediction methods based on the minimum phase assumption in the sense of statistical stability.

A futher important advantage of the novel method is that it is universal in the sense that it does not impose any restrictions on the nature of the input, and therefore can be applied to a wide range of problems. Thus, the tap index n in the above relationships may be one-dimensional, as in the data communication problem where n represents normalized sample time. The index n may also be multi-dimensional, as in the image reconstruction problem.

The proposed method can be used for the purpose of system identification where the equalizer can be viewed as the model for the inverse of the unknown system. The proposed method can also be used for the purpose of speech/image enhancement and compression, where the equalizer parameters correspond to the speech/image parameters, e.g. the LPC parameters in speech.

Further features and advantages of the invention will be apparent from the description below.

BRIEF DESCRIPTION OF THE DRAWINGS

The invention is herein described, by way of example only, with reference to the accompanying drawings, wherein.

MATHEMATICAL PRELIMINARIES

It is believed a discussion of mathematical preliminaries at this point will be helpful in understanding the description of the present invention following this discussion.

A. Notations:

We denote a tensor (a matrix) by an upper-case letter (e.g. X), a column tensor (a column matrix) by a lower case bold faced letter (e.g. x), and a scalar by a lowercase non-bold letter (e.g. x).

We denote by $x_n$ the $n^{th}$ element of a set of real/complex numbers. For example, $x_n$ may be the $n^{th}$ time sample or the $n^{th}$ component in a sequence, or it can represent the value of a sampled image at location n.

$\Sigma_n$—sum over all possible values of n $\pi_{l=n}{}^m(.)$—the product $(.)_n . (.)_{n+1} \ldots (.)_m$ $x^T$—transpose of a tensor x $x^+$—conjugate-transpose of a tensor x.

$x^*$—complex conjugate of a scalar x.

$|x|$—complex magnitude (absolute value) of a scalar x.

Figure 2:
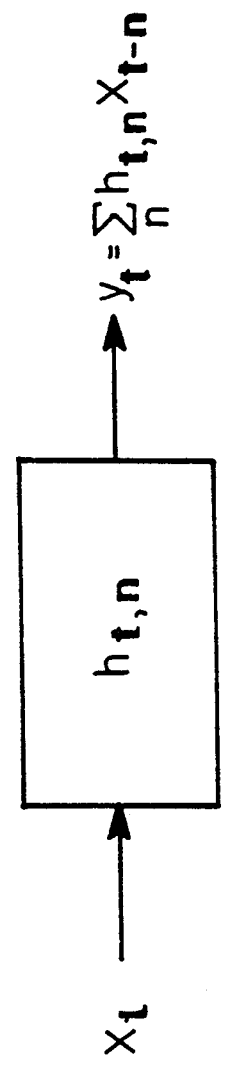

B. Linear Systems:

The relation between the input $x_t$ and the output $y_t$ of a linear system (filter) is given by (See FIG. 2):

$$y_t = \sum_n h_{t,n} x_{t-n}$$

where $h_{t,n}$ is the (t,n) tap of the linear system.

The linear system whose (t,n) tap is $h_{t,n}$ convolved (combined) with the linear system whose (t,n) tap is $g_{t,n}$ is the linear system whose (t,n) tap is $\Sigma_k g_{t,k} h_{t-k,n-k}$ If the linear system is shift invariant then $h_{t,n}$ is invariant of t, in which case we denote by $h_n = h_{t,n}$ its $n^{th}$ tap.

The transfer function (frequency response) of a linear shift invariant system whose $n^{th}$ tap is $h_n$ is given by:

$$H(w) = \sum_n h_n e^{-jwT_n}$$

C. Cumulants and High-Order Spectrum

The joint cumulant of the random variables $x_1, x_2, \ldots x_m$ is defined by:

$$cum(x_1; x_2; \ldots x_m) = \left. \frac{\partial^m \ln E\left\{ e^{j \sum_{i=1}^{m} \mu_i x_i} \right\}}{\partial \mu_1 \partial \mu_2 \ldots \partial \mu_m} \right|_{\mu_1 = \mu_2 = \ldots = \mu_m = 0}$$

where $$\frac{\partial^m}{\partial \mu_1 \partial \mu_2 \ldots \partial \mu_m}$$

is the joint derivative of order m with respect to the variables $\mu_1, \ldots \mu_m$; $\ln(.)$ is the natural logarithm (to the base of e), $j = \sqrt{-1}$ and $E\{.\}$ is the statistical expectation of the bracketed quantity.

A general formula relating cumulants to moments of the random variables $x_1, x_2, \ldots x_m$ is given in the book: D. R. Brillinger, "Time Series, Data Analysis and Theory" Holden-Day, California, 1981.

Thus, for example:

$$cum(x_1) = E\{x_1\}$$
$$cum(x_1; x_2) = E\{x_1 x_2\} - E\{x_1\} E\{x_2\}$$

For notational convenience, we denote by:

$$cum(\ldots; \underbrace{x; x; \ldots x;}_{p \text{ terms}} \ldots) = cum(\ldots; x:p; \ldots)$$

Let $x_t$ be a set of random variables such that $cum(x_t; x_{t-t_1}; \ldots x_{t-t_{p-1}}; x_{t-t_p}^*; \ldots x_{t-t_{p+q}}^*)$ is independent of t for all combinations of $t_1, \ldots t_{p+q}$; Then, its (p,q)-order spectrum is defined by:

$$S_x^{p,q}(w_1, \ldots W_{p+q}) = \sum_{t_1} \ldots \sum_{t_{p+q}} cum(x_t, x_{t-t_1}; \ldots$$

$$\ldots x_{t-t_{p-1}}; x_{t-t_p}^*; \ldots x_{t-t_{p+q}}^*) e^{j \sum_{i=1}^{p+q} w_i T_{t_i}}$$

D. Tensors

A tensor A is an array of real/complex valued numbers whose (n,m) element is denoted by $A_{nm}$.

The product of a tensor A by a tensor B is a tensor C=AB whose (n,m) element is:

$$C_{nm} = \sum_k A_{nk} B_{km}$$

The unit tensor is a tensor whose (n,m) element is equal to 1 whenever n=m and equal to zero whenever n≠m.

The inverse $A^{-1}$ of a tensor A is a tensor whose product by A is equal to the unit tensor.

The transpose $A^T$ of a tensor A is a tensor whose (n,m) element is $A_{mn}$. The conjugate-transpose $A^+$ of a tensor A is a tensor whose (n,m) element is $A_{mn}^*$.

A column tensor b is a tensor whose (n,m) element is 0 whenever m≠0. We denote the (n,0) element of b by $b_n$.

Finally we note that if the subscripts n and m are one-dimensional then the tensor A and the column tensor b are a matrix and a column-matrix (vector), respectively.

ALGORITHM IMPLEMENTATION

Figure 1:
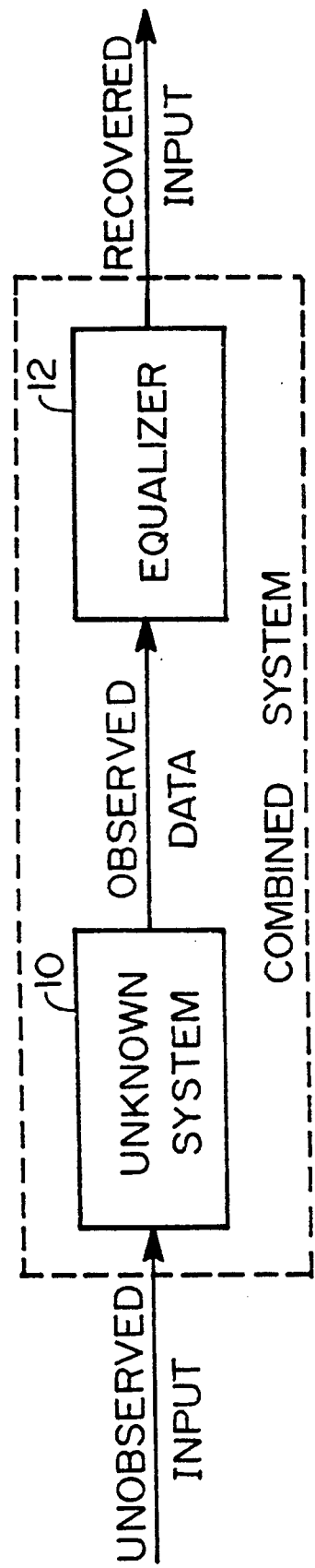
FIGS. 1, 2 and 6 are diagrams helpful in explaining the invention.

As described earlier, the present invention involves systems for processing the output of an unknown system, shown as 10 in FIG. 1, and controlling an adjustable linear filter (equalizer), shown as 12 in FIG. 1, receiving the output in order to produce a desired response for recovering (deconvolving) the input to the system. The invention involves the development of iterative algorithms in which the unknown system whose (t,n) taps, for some combinations of t and n, are iteratively adjusted according to the following rule:

$$s_{t,n}' = \sum_{i=1}^{I} a_i s_{t,n}^{p_i} (s_{t,n}^*)^{q_i}$$

where $s_{t,n}$ denotes the (t,n) tap before the iteration, $s'_{t,n}$ denotes the (t,n) tap after the iteration, I is a preselected integer greater then or equal to one, $a_i, i = 1, 2 \ldots I$ are preselected scalars that may vary from iteration to iteration, and $p_i, q_i, i = 1, 2, \ldots I$ are preselected non-negative integers such that $p_i + q_i \geq 2$.

According to preferred embodiments of the invention described below, the equalizer is adjusted such that the unknown system combined with the equalizer behaves essentially as a linear shift invariant system whose taps are iteratively adjusted according to the following rule:

$$s_n' = \sum_{i=1}^{I} a_i s_n^{p_i}(s_n^*)^{q_i} \tag{1}$$

where $s_n$ denotes the $n^{th}$ tap before the iteration and $s'_n$ denotes the $n^{th}$ tap after the iteration.

Preferably $I=1$, such that:

$$s'_n = \alpha s_n^p (s_n^*)^q \tag{2}$$

where $\alpha$ is a preselected scalar that may vary from iteration to iteration, and p and q are preselected non-negative integers such that $p+q \geq 2$.

To simplify the exposition, only the procedure in (2) has been considered. To further simplify the exposition, only the case where the equalizer is a linear shift invariant system has been considered. However, the indicated generalizations may also be useful. Following are descriptions of several algorithm implementations of the methods in (2).

If the unknown system input can be modeled as a set of statistically independent random variables—which is typically the case in digital communications—and the equalizer is a linear shift invariant system, then the equalizer taps are iteratively adjusted such that:

$$c' = \alpha R^{-1} d \tag{3}$$

where $c'$ is the column tensor whose $n^{th}$ element, $c'_n$, is the $n^{th}$ tap of the equalizer after the iteration, R is the tensor whose (n,m) element is:

$$R_{nm} = \text{cum}(y_{t-m}; y_{t-n}^*) \tag{4}$$

where $y_t$ is the given data at the input to the equalizer, and d is the column tensor whose $n^{th}$ element is:

$$d_n = \text{cum}(z_t : p; z_t^* : q; y_{t-n}^*) \tag{5}$$

where $z_t$ is the output of the equalizer given by:

$$z_t = \sum_n c_n y_{t-n} \tag{6}$$

where $c_n$ is the $n^{th}$ tap of the equalizer before the iteration, and where the subscripts n and m belong to a pre-specified set.

Figure 3:
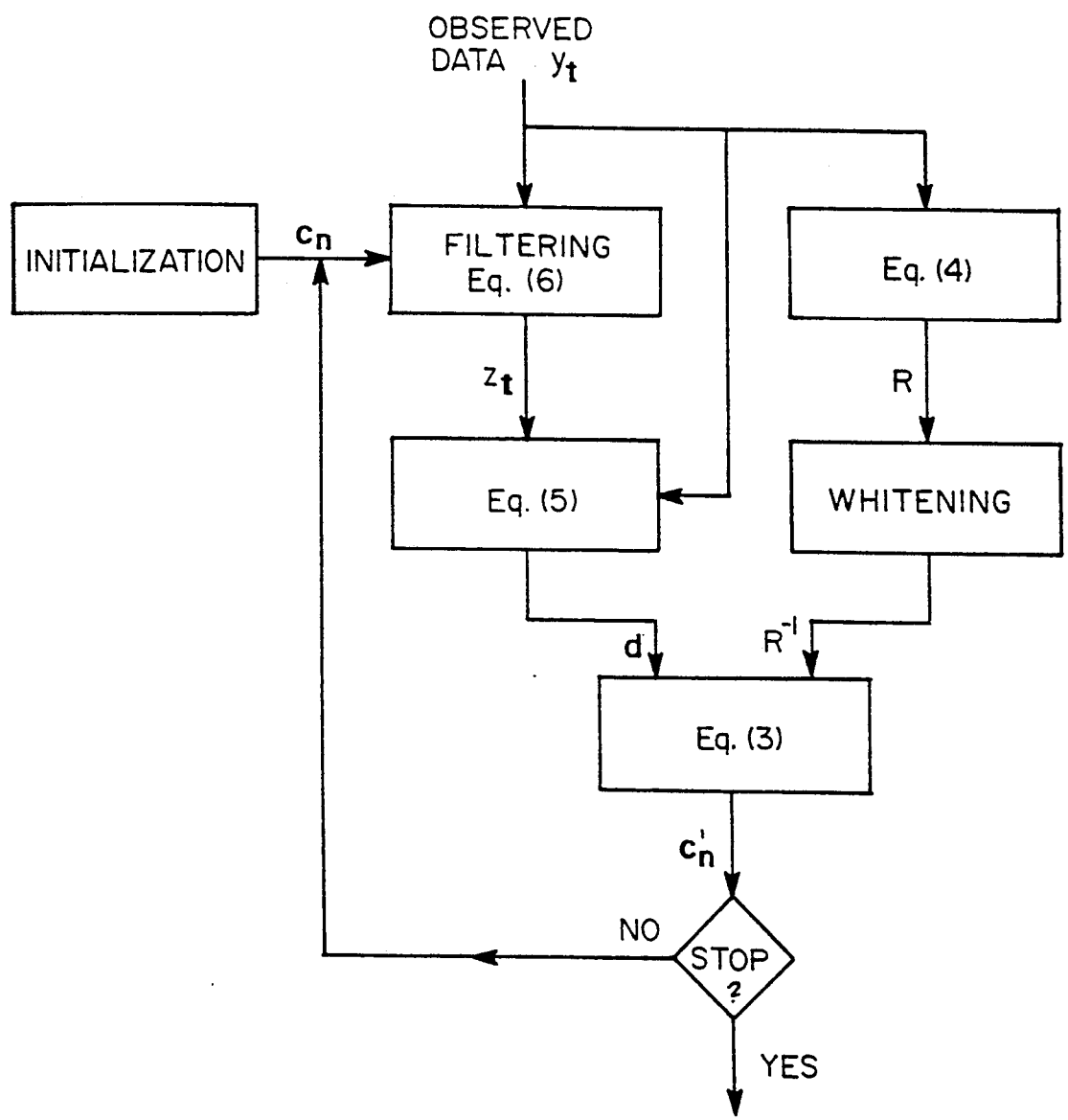
FIGS. 3, 4, 5 and 7 are flow charts illustrating four algorithms in accordance with the present invention for iteratively adjusting the equalizer in order to identify the inverse of the unknown system and to recover (deconvolve) the unknown system input from measurements of its input.

We note that the multiplication by $R^{-1}$ in (3) corresponds to spectral whitening of the observed data $y_t$. A flow chart of the algorithm is illustrated in FIG. 3.

The elements of d can also be computed by:

$$d_N = \tag{7}$$

$$\sum_{k_1} \sum_{k_2} \ldots \sum_{k_p} \sum_{k_{p+1}} \sum_{k_{p+2}} \ldots \sum_{k_{p+q}} c_{k_1} c_{k_2} \ldots c_{k_p} c_{k_{p+1}}^* c_{k_{p+2}}^* \ldots$$

$$c_{k_{p+q}}^* \text{cum}(y_{t-k_1}; y_{t-k_2}; \ldots y_{t-k_p};$$

$$y_{t-k_{p+1}}^*; y_{t-k_{p+2}}^*; \ldots y_{t-k_{p+q}}^*; y_{t-n}^*)$$

Figure 4:
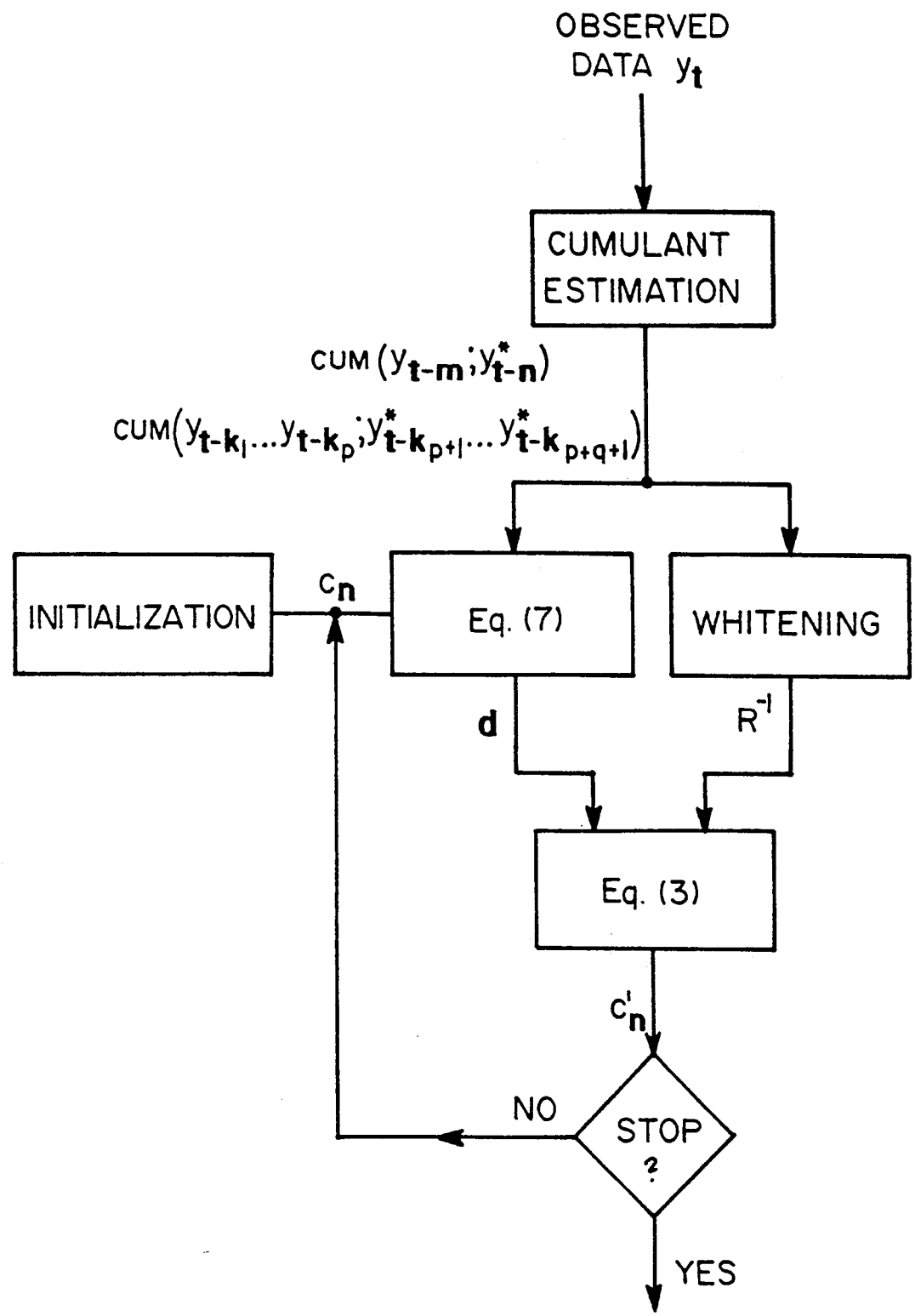

Equation (5) suggests to compute joint cumulants of $y_t$ and $z_t$ at each iteration of the algorithm. Equation (7) suggests to first compute the cumulants of the given data set $y_t$, then to perform the iterations with respect to the taps of the equalizer until convergence is accomplished, and only then to generate $z_t$ according to (6). A flow chart of this algorithm is illustrated in FIG. 4.

We note that the subscripts n, m, t, etc. in the above equations may be one-dimensional as in e.g. speech processing and time series analysis problems, or multi-dimensional as in e.g. image processing problems. If n is one-dimensional then R becomes a matrix and d becomes a column vector.

Figure 5:
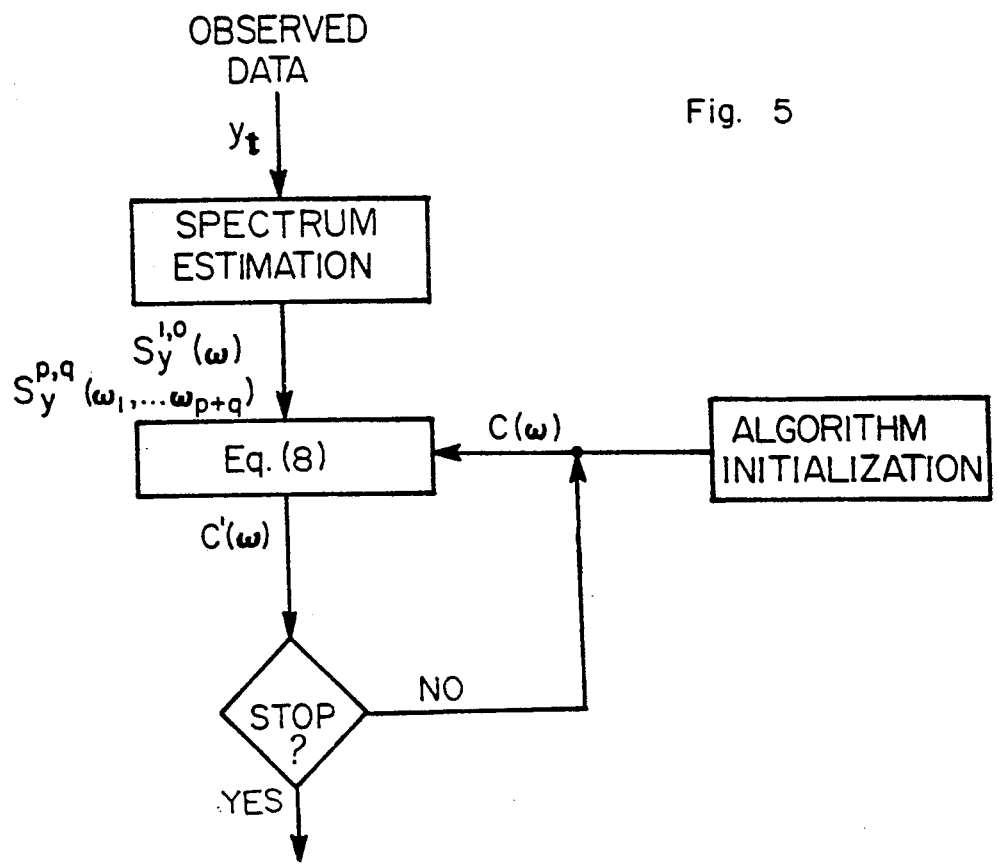

If the unknown system input can not be modeled as a set independent random variables, then it is convenient to work in the frequency domain. The resulting iterative algorithm consists of iteratively adjusting the transfer function (frequency response) of the equalizer such that:

$$C'(w) = \alpha \frac{S_a^{1,0}(w)}{S_y^{1,0}(w)} \sum_{w_1} \sum_{w_2} \ldots \tag{8}$$

$$\sum_{w_{p+q-1}} \frac{S_y^{p,q}(-w_1, -w_2, \ldots -w_{p+q-1}, w)}{S_a^{p,q}(-w_1, -w_2, \ldots -w_{p+q-1}, w)} \cdot$$

$$\left[\prod_{i=1}^{p-1} C(w_i)\right] \left[\prod_{l=p}^{p+q-1} C^*(-w_l)\right] C\left(w - \sum_{i=1}^{p+q-1} w_i\right)$$

where $C'(w)$ is the transfer function of the equalizer after the iteration, $C(w)$ is the transfer function of the equalizer before the iteration, $S_y^{1,0}(w)$ is the (1,0)-order spectrum (power spectrum) of $y_t$, $S_y^{p,q}(w_1, w_2, \ldots, w_{p+q})$ is the (p,q)-order spectrum of $y_t$, and $S_a^{1,0}(w)$ and $S_a^{p,q}(w_1 w_2, \ldots, w_{p+q})$ are preselected functions which are related to the (1,0)-order spectrum and the (p,q)-order spectrum of the unknown system input, and where $w$ and $w_1, w_2, \ldots w_{p+q-1}$ belong to a prespecified set of frequencies. We note that w may be one-dimensional or multi-dimensional depending on the application. A flow chart of the algorithm is illustrated in FIG. 5.

In order to ensure the convergence of all the proposed algorithms, it is suggested to select $\alpha$ every few iterations such that $$\text{cum}(z_t; z_t^*) = \eta_t \tag{9}$$

where $z_t$ is the output of the equalizer, and $\eta_t$ are preselected set of numbers, e.g. $\eta_t = \text{cum}(a_t; a_t^*)$ if it is known a-priori.

An important feature of the proposed methods is that they do not suffer from spurious/ambiguous solutions, and they converge to the desired solution regardless of initialization. Another important feature of the proposed methods is that they are capable of solving the blind deconvolution problem regardless of the phase characteristics of the unknown system, unlike the conventional linear prediction methods that can solve the problem only if the unknown system is minimum-phase. Moreover, in many cases of practical interest, the proposed methods are statistically more stable (i.e., have smaller variance and smaller ISI than linear prediction methods).

We may consider combining several of the proposed algorithms for different pairs of p,q in order to improve the robustness and statistical stability of the outcome results e.g. as suggested by (1). We may also consider combining linear prediction methods with the proposed methods in order to improve statistical stability and yet to obtain a method that is capable of identifying phase characteristics.

Figure 6:
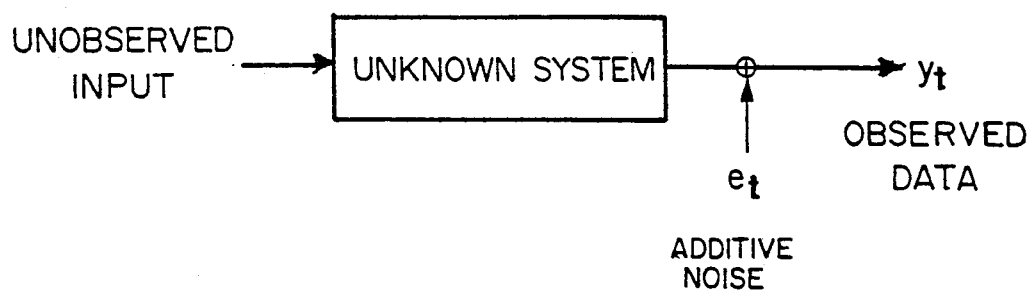

In many practically interesting situations the observed data $y_t$ is contaminated by additive noise which we denote by $e_t$ as illustrated in FIG. 6. If the noise cumulants/spectra are known a-priori or can be measured separately, it is recommended to eliminate its effect by subtraction, that is to compute the elements of R and d used in the iterative algorithm in (3) as follows:

$$R_{nm} = cum(y_{t-m}; y_{t-n}^*) - cum(e_{t-m}; e_{t-n}^*) \tag{10}$$

$$d_n = cum(z_t; p; z_t^*; q; y_{t-n}^*) - \sum_{k_1}\sum_{k_2} \cdots \sum_{k_p}\sum_{k_{p+1}}\sum_{k_{p+2}} \cdots \tag{11}$$

$$\sum_{k_{p+q}} c_{k_1} c_{k_2} \cdots c_{k_p} c_{k_{p+1}}^* c_{k_{p+2}}^* \cdots c_{k_{p+q}} cum(e_{t-k_1}; e_{t-k_2}; \cdots$$

$$e_{t-k_p}; e_{t-k_{p+1}}; e_{t-k_{p+2}}^*; \cdots e_{t-k_{p+q}}^*; e_{t-n}^*)$$

Similarly, to eliminate the effect of additive noise in the iterative algorithm suggested by (8), it is recommended to replace $S_y^{p,q}(-w_1,-w_2,\ldots-w_{p+q-1},w)$ and $S_y^{1,0}(w)$ in (8) by $[S_y^{p,q}(-w_1,-w_2,\ldots -w_{p+q-1},w)-S_e^{p,q}(-w_1,-w_2,\ldots -w_{p+q-1},w)]$ and $[S_y^{1,0}(w)-S_e^{1,0}(w)]$ respectively, where $S_e^{p,q}(w_1,w_2,\ldots w_{p+q})$ and $S_e^{1,0}(w)$ are, respectively, the (p,q)-order spectrum and the (1,0)-order spectrum of $e_t$.

We note that if $e_t$ is Gaussian then its (p,q)-order cumulant/spectrum is identically zero whenever $p+q \geq 2$, and therefore it affects only the computation of covariance matrix R or the (1,0)-order spectrum $S_y^{1,0}(w)$.

We also note that in the blind deconvolution problem, if we want to minimize the means square restoration error between the recovered data set at the output of the equalizer and the unobserved input of the unknown system, it is recommended to perform a final iteration of the algorithm (3) or (8) in which only the contribution of the noise to the high order cumulants/spectra is subtracted, but the contribution to the second order statistics is not subtracted. Thus, in the case where $e_t$ is Gaussian—which is a very common case—in order to minimize the mean square restoration error we should perform a final iteration of the algorithm without any subtraction of the noise contribution.

We note that in the implementation of the algorithm in (3) the cumulants are typically replaced by their sample estimates based on the given data at the input and output of the equalizer. Similarly, in the algorithm given by (8) the (1,0)-order spectrum and the (p,q)-order spectrum are replaced by their sample estimates.

The iterative algorithm given by (3) can be converted into a sequential algorithm by performing the iterations sequentially with the data such that the equalizer is adjusted sequentially.

Thus, assuming for simplicity that t is one dimensional, that the equalizer is a finite impulse response (FIR) filter whose vector taps is $c=(c_{L1}\ c_{L1+1}\ \cdots\ c_{L2})^T$, and that $y_t$ is zero-mean, then in case $p=1$, $q=1$ we obtain the following sequential algorithm in which we perform one iteration per data sample:

$$c^{(t)} = c^{(t-1)} + \beta_t Q_t y_t^* z_t (z_t^* - \gamma_t) \tag{12}$$

where $$c^{(t)} = (c_{L1}^{(t)} c_{L1+1}^{(t)} \ldots c_{L2}^{(t)})^T$$

is the vector equalizer taps after t iterations, $$Q_t = \frac{1}{1-\delta_t}\left[Q_{t-1} - \frac{\delta_t Q_{t-1} \nu_{t-1}^* \nu_{t-1}^T Q_{t-1}}{1 - \delta_t + \delta_t \nu_{t-1}^T Q_{t-1} \nu_{t-1}^*}\right] \tag{13}$$

$$\nu_t = (y_{t-L1} y_{t-L1-1} \ldots y_{t-L2})^T \tag{14}$$

$$\nu_t^* = (y_{t-L1}^* y_{t-L1-1}^* \ldots y_{t-L2}^*)^T$$

$$z_t = y_t^T c^{(t-1)}$$

where $Q_0$ is a preselected matrix; $c^{(0)}$ is a preselected vector; $L_1$ and $L_2$ are preselected numbers; and $\beta_t$, $\gamma_t$, $\delta_t$ are preselected sequences of numbers.

Figure 7:
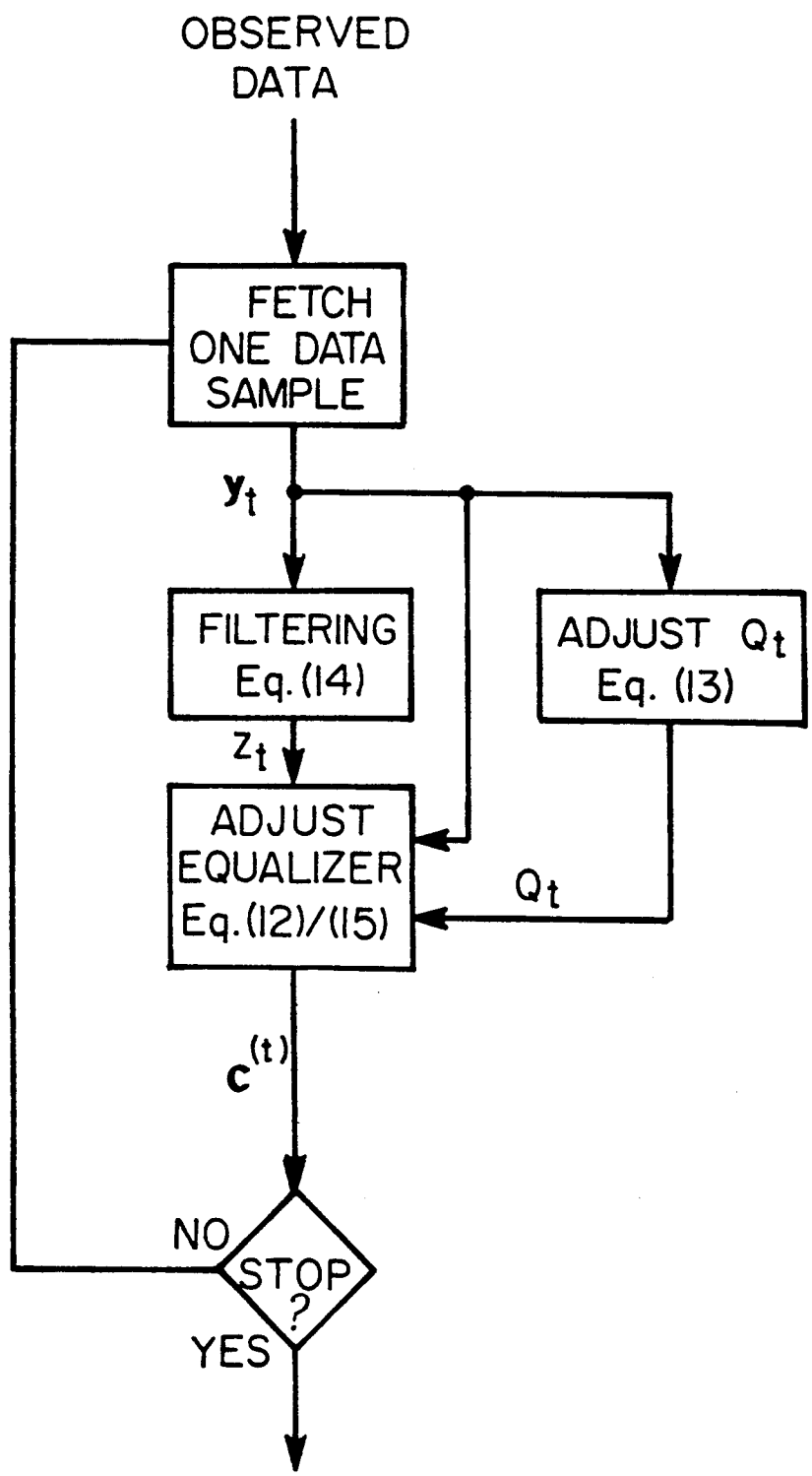

In case $p=2$, $q=1$ we obtain the following sequential algorithm:

$$c^{(t)} = c^{(t-1)} + \beta_t Q_t \nu_t^* z_t (|z_t|^2 - \rho_t) \tag{15}$$

where $\rho_t$ is preselected. A flow chart of the algorithm is illustrated in FIG. 7.

If we eliminate the multiplying matrix $Q_t$ in (15) (i.e., replacing $Q_t$ by the identity matrix) then under certain choice of $\beta_t$ and $\rho_t$ our algorithm reduces to Godard's algorithm for blind deconvolution as described in the paper: D. Godard, "Self recovering equalization and carrier tracking in two-dimensional data communication systems," IEEE Trans. Commun. Vol. COM-28, No. 11, pp. 1867-1875, Nov. 1980. The additional multiplication by $Q_t$ in our algorithm may significantly improve convergence rate, statistical stability, and sensitivity to additive noise.

The sequential algorithms in (12) and (15) may be particularly useful in time series analysis and modeling, in speech enhancement and compression and the like. Similar algorithms for other combinations of p and q can also be derived. We may also consider combining the two algorithms, and perhaps other algorithms in the class in order to improve statistical stability and robustness of the algorithm.

DESCRIPTION OF A PREFERRED EMBODIMENT

Figure 8:
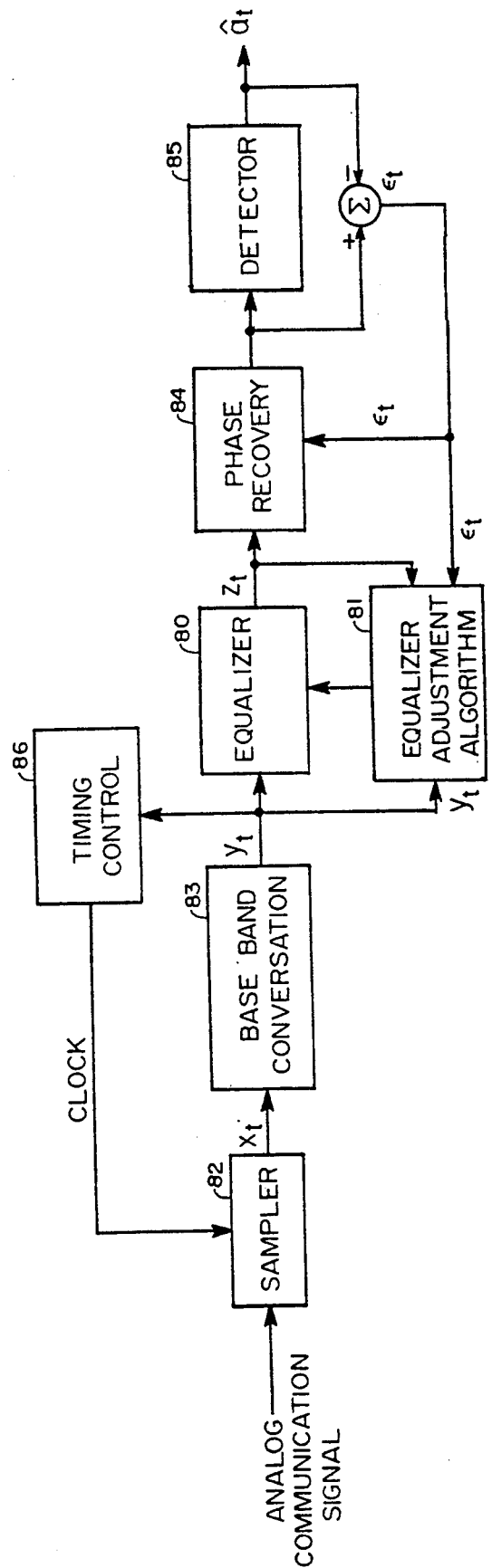
FIG. 8 is a block diagram illustrating a digital, quadrature amplitude modulation (QAM) demodulator constructed in accordance with the present invention.
Figure 9:
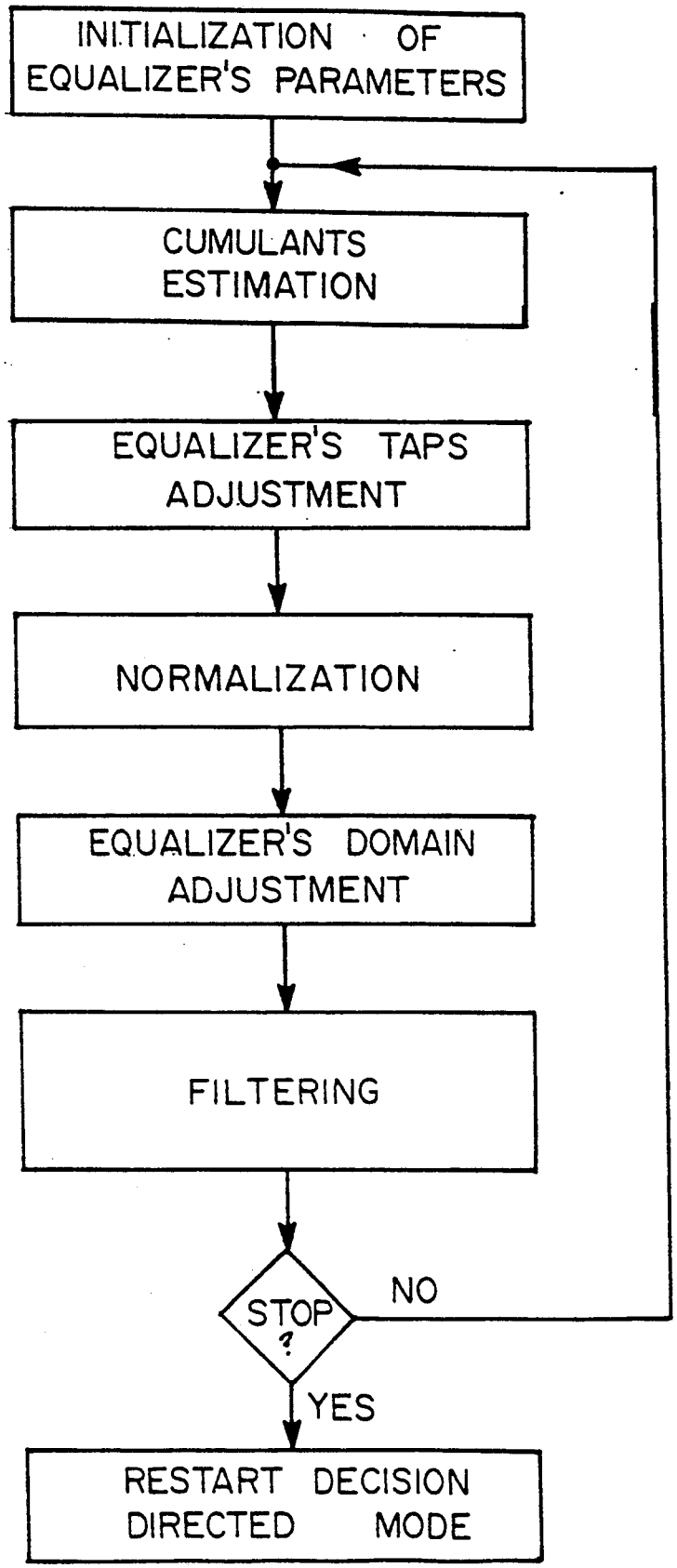
FIG. 9 is a flow chart illustrating the blind deconvolution method for controlling the demodulator of FIG. 8.

FIG. 8 is a block diagram illustrating a known all-digital quadrature amplitude modulation (QAM) demodulator (see e.g. the book: J. G. Proakis, "Digital Communications", McGrew-Hill, 2nd edition, 1989) constructed in accordance with the present invention. It includes an equalizer 80, in the form of a linear filter which is adjustable by a processor 81 in accordance with the method of the present invention. In the example illustrated in FIG. 8, and in its respective flow chart of FIG. 9, the integration algorithm is that of equation (3) with $p=2$, $q=1$. Thus, by controlling the equalizer 80 to recover the input signal sequence to the demodulator, the illustrated system enables operation of the demodulator without the need for training sequences, and even without the need to know a-priori the constellation of the transmitted data symbols.

The illustrated demodulator is a system which detects transmitted data symbols from a measured QAM analog communication signal. The demodulator consists of several sub-units whose function is described below.

The sampler unit 82 converts the QAM analog communication signal into a discrete sequence $x_t$ that is sampled at the BAUD rate. Note that in this specific application t is a one-dimensional variable corresponding to the index of the time sample.

The timing control unit 86 supplies sampling delays such that the demodulator is synchronized with the modulator.

The baseband conversion unit 83 generates a complex-valued sequence $y_t$, whose real and imaginary parts are lowpass filtered versions of the sampled signal multiplied by a cosine wave and a sine wave, respectively, at the modulation frequency.

The equalizer unit 80 processes the output $y_t$ of the baseband conversion unit through an equalizer in order to recover the transmitted data symbols $a_t$ up to a delay and a possible phase shift.

The phase recovery unit 84 adjusts the phase of the recovered symbols at the output of the equalizer using a decision feedback loop.

The detector unit 85 processes the output of the phase recovery unit to produce the estimated (recovered) data symbols $\hat{a}_t$, obtained by minimizing the magnitude of the restoration error $\epsilon_t$ using a memoryless nearest neighbor (minimum distance) decision rule.

We shall now turn to the equalizer adjustment unit 81, which constitutes our novel contribution to the demodulator system. The proposed algorithm is a special case of (3) where $p=2$ and $q=1$. A flow chart of the algorithm is given in FIG. 9.

The relation between the input $y_t$ and the output $z_t$ of the equalizer is given by:

$$z_t = \sum_{n=L_1}^{L_2} c_n y_{t-n}$$

where the parameters of the equalizer $L_1$, $L_2$ and $c_{L_1}, \ldots c_{L_2}$ are adjusted by the equalizer adjustment unit. Detailed description of the proposed algorithm is given below:

(A) Algorithm Initialization

Accumulate N samples $y_1, \ldots y_N$ at the input to the equalizer.

Set $L_1 = -M_0$, $L_2 = M_0$ where $M_0$ is preselected positive integer ($M_0$ is on the order of the length of the equalizer needed to recover the transmitted data symbols).

Set the $L \times 1$ vector of equalizer taps $c = (c_{L_1}, \ldots c_{L_2})^T$ such that $c_0 = 1$ and $c_n = 0$ for all $n \neq 0$, where $L = L_2 - L_1 + 1$ is the number of equalizer taps.

(B) Cumulants estimation

Compute the $L \times L$ matrix R whose (n,m) element is:

$$R_{nm} = \begin{cases} r_{n-m} & n \geq m \\ r_{m-n}^* & n < m \end{cases}$$

$$n, m = L_1, L_1 + 1 \ldots L_2$$

where $$r_n = \frac{1}{N-L} \sum_{t=1}^{N-L} y_t^* y_{t+n}$$

$$n = 0, \ldots L - 1$$

Compute the $L \times 1$ vector $d = (d_{L_1}, \ldots d_{L_2})^T$ whose $n^{th}$ element is $$d_n = \frac{1}{N-L} \sum_{t=1+L_2}^{N+L_1} |z_t|^2 z_t y_{t-n}^* - 2(c^+ R c) \sum_{m=L_1}^{L_2} R_{nm} c_m$$

Comment: If the cumulants of the additive noise at the input to the equalizer are known a-priori can be measured separately, it is recommended to subtract them from R and d as suggested in (10) and (11) respectively.

(C) Equalizer Taps Adjustment

Compute the $L \times 1$ vector $c' = (c'_{L_1}, \ldots c'_{L_2})^T$:

$c' = R^{-1} d$

Where we note that this computation can be carried out efficiently (order of $L^2$ operations) using the Toepliz form of R (See the book: I. C. Gohberg and I. A. Feldman, "Convolution Equations and Projection Methods for their Solution", American Mathematical Society, 1974).

(D) Normalization

Compute the $L \times 1$ vector $c'' = (c''_{L_1}, \ldots c''_{L_2})^T$:

$$c'' = ac'$$

where $$a = \sqrt{\frac{\eta}{c'^+ R c'}}$$

where $\eta > 0$ is preselected, e.g. $\eta = E\{|a_t|^2\}$ is the average power of the input symbol if it is known a-priori.

(E) Equalizer's Domain Adjustment

Calculate $$D = \sum_{n=L_1}^{L_2} |c_n - c_n''| - \mu \sum_{n=L_1}^{L_2} |c_n|$$

where $\mu \geq 0$ is preselected, e.g. $\mu = 0.01$. Comment: D measures the distance between the equalizer taps before and after the iteration.

Set $L'_1$ to be the maximal integer K such that $$\sum_{n=L_1}^{K+M_1} |c_n''| < \gamma \sum_{n=L_1}^{L_2} |c_n''|$$

Set $L'_2$ to be the minimal integer K such that $$\sum_{n=K-M_2}^{L_2} |c_n''| < \gamma \sum_{n=L_1}^{L_2} |c_n''|$$

where $0 < \gamma < 1$ is preselected (e.g. $\gamma = 0.1$) and $M_1$, $M_2$ are preselected positive integers.

Set $$c_n = \begin{cases} c_n'' & L_1 \leq n \leq L_2 \\ 0 & \text{elsewhere} \end{cases}$$

$$n = L_1', \ldots L_2'$$

Set $$L_1 = L'_1, L_2 = L'_2$$

(F) Filtering

Compute $$z_t = \sum_{n=L_1}^{L_2} c_n y_{t-n}$$

$$t = 1 + L_2, \ldots N + L_1$$

(G) Stop?
If $D>0$ then
   Goto step (B)
else
   Stop equalizer adjustment (exit).

After the iterations of the proposed algorithm have stopped, we may switch to a decision directed equalization (DDE) provided that the constellation of the input data symbols is known a-priori or can be identified from the recovered symbols at the output of the equalizer. We then switch back from the DDE mode of operation to the proposed algorithm whenever is needed.

While the invention has been described with respect to several algorithms and one application, it will be appreciated that many other variations, modifications and applications of the invention may be made.

What is claimed is:

1. A method for controlling an equalizer to be coupled to an unknown system having an input and an output which equalizer receives the output of the unknown system in order to produce a response recovering the input to said system, characterized by iteratively adjusting the equalizer such that the unknown system combined with the equalizer behaves essentially as a linear system whose $(t,n)$ taps, for some combinations of $t$ and $n$, are iteratively adjusted according to the following rule:

$$s_{t,n}' = \sum_{i=1}^{I} \alpha_i s_{t,n}^{p_i} (s_{t,n}^*)^{q_i}$$

where $s_{t,n}$ denotes the $(t,n)$ tap before the iteration, $s'_{t,n}$ denotes the $(t,n)$ tap after the iteration, $I$ is a preselected integer greater than or equal to one, $\alpha_i\ i=1,2\ldots I$ are preselected scalars that may vary from iteration to iteration, and $p_i$, $q_i$ $i=1,2,\ldots I$ are preselected non-negative integers such that $p_i+q_i \geq 2$.

2. The method according to claim 1 wherein the unknown system combined with the equalizer behaves essentially as a linear shift invariant system whose taps are interatively adjusted according to the following rule:

$$s_n' = \sum_{i=1}^{I} \alpha_i s_n^{p_i} (s_n^*)^{q_i}$$

where $s_n$ denotes the $n^{th}$ tap before the iteration and $s'_n$ denotes the $n^{th}$ tap after the iteration.

3. The method according to claim 2, wherein $I=1$, such that $$s'_n = \alpha s_n^p (s_n^*)^q$$

where $\alpha$ is a scalar that may vary from iteration to iteration, and $p$ and $q$ are preselected non-negative integers such that $p+q \geq 2$.

4. The method according to claim 3, wherein the equalizer is a linear shift invariant system whose taps are iteratively adjusted such that:

$$c' = \alpha R^{-1} d$$

where $c'$ is the column tensor whose $n^{th}$ element, $c'_n$ is the $n^{th}$ tap of the equalizer after the iteration, $R$ is the tensor whose $(n,m)$ element is:

$$R_{nm} = \text{cum}(y_{t-m}; y_{t-n}^*)$$

where $y_t$ is the input to the equalizer, and $d$ is the column tensor whose $n^{th}$ element is:

$$d_n = \text{cum}(z_t; p; z_t^* q; y_{t-n}^*)$$

where $z_t$ is the output of the equalizer given by:

$$z_t = \sum_n c_n y_{t-n}$$

where $c_n$ is the $n^{th}$ tap of the equalizer before the iteration, and the subscripts $n$ and $m$ belong to a pre-specified set.

5. The method according to claim 4 wherein the elements of $d$ are computed as follows:

$$d_n = \sum_{k_1} \sum_{k_2} \cdots \sum_{k_p} \sum_{k_{p+1}} \sum_{k_{p+2}} \cdots$$
$$\sum_{k_{p+q}} c_{k_1} c_{k_2} \cdots c_{k_p} c_{k_{p+1}}^* c_{k_{p+2}}^* \cdots c_{k_{p+q}}^* \text{cum}(y_{t-k_1}; y_{t-k_2}; \cdots$$
$$y_{t-k_p}; y_{t-k_{p+1}}^*; y_{t-k_{p+2}}^*; \cdots y_{t-k_{p+q}}; y_{t-n}^*)$$

6. The method according to claim 3 wherein the equalizer is a linear shift invariant system whose transfer function is iteratively adjusted such that:

$$C'(w) = \alpha \frac{S_a^{1,0}(w)}{S_y^{1,0}(w)} \sum_{w_1} \sum_{w_2} \cdots$$
$$\sum_{w_{p+q-1}} \frac{S_y^{p,q}(-w_1,-w_2,\ldots,-w_{p+q-1},w)}{S_a^{p,q}(-w_1,-w_2,\ldots,-w_{p+q-1},w)} \cdot$$
$$\left[\prod_{i=1}^{p-1} C(w_i)\right]\left[\prod_{i=p}^{p+q-1} C^*(-w_i)\right] C\left(w - \sum_{i=1}^{p+q-1} w_i\right)$$

where $C'(w)$ is the transfer function of the equalizer after the iteration, $C(w)$ is the transfer function of the equalizer before the iteration, $S_y^{1,0}(w)$ is the (1,0)-order spectrum (power spectrum) of $y_t$, $S_y^{p,q}(w_1, w_2, \ldots, w_{p+q})$ is the $(p,q)$-order spectrum of $y_t$ where $p$ and $q$ are preselected non-negative integers such that $p+q \geq 2$, $S_a^{1,0}(w)$ and $S_a^{p,q}(w_1, w_2, \ldots, w_{p+q})$ are preselected functions, and where $w$ and $w_1, w_2, \ldots w_{p+q-1}$ belong to a prespecified set of frequencies.

7. The method according to claim 3 wherein $\alpha$ is selected at some iterations such that $$\text{cum}(z_t; z_t^*) = \eta_t$$

where $z_t$ is the output of the equalizer and $\eta_t$ is preselected.

8. The method according to claim 1 wherein the cumulants/spectra of additive noises at some iterations are subtracted from the respective data cumulants/spectra.

9. The method according to claim 1 wherein the cumulants/spectra are replaced by their estimates based on the available data at the input and output of the equalizer.

10. The method according to claim 1 wherein the iterations are performed sequentially such that the equalizer is adjusted sequentially.

11. The method according to claim 10 wherein $t$ is one-dimensional, and the equalizer is adjusted sequentially as follows:

$$c^{(t)} = c^{(t-1)} + \beta_t Q_t y_t^* z_t (z_t^* - \gamma_t)$$

where $$c^{(t)} = (c_{L_1}^{(t)} c_{L_1+1}^{(t)} \ldots c_{L_2}^{(t)})^T$$

is the vector equalizer taps after t iterations, $$Q_t = \frac{1}{1-\delta_t}\left[Q_{t-1} - \frac{\delta_t Q_{t-1} y_{t-1}^* y_{t-1}^T Q_{t-1}}{1 - \delta_t + \delta_t y_{t-1}^T Q_{t-1} y_{t-1}^*}\right]$$

$$y_t = (y_{t-L_1} y_{t-L_1-1} \ldots y_{t-L_2})^T$$

$$y_t^* = (y_{t-L_1}^* y_{t-L_1-1}^* \ldots y_{t-L_2}^*)^T$$

$$z_t = y_t^T c^{(t-1)}$$

where $Q_0$ is a preselected matrix; $c^{(0)}$ is a preselected vector; $L_1$ and $L_2$ are preselected numbers; and $\beta_t$, $\gamma_t$, $\delta_t$ are preselected sequences of numbers.

12. The method according to claim 11 wherein $$c^{(t)} = c^{(t-1)} + \beta_t Q_t y_t^* z_t (|z_t|^2 - \rho_t)$$

where $\rho_t$ is preselected.

13. Apparatus to be coupled to an unknown system having an input and an output for producing a response recovering the input to said system, comprising an equalizer receiving the output of the unknown system and a processor for iteratively adjusting the equalizer such that the unknown system combined with the equalizer behaves essentially as a linear system whose (t, n) taps, for some combinations of t and n, are iteratively adjusted according to the following rule:

$$s_{t,n}' = \sum_{i=1}^{I} a_i s_{t,n}^{p_i} (s_{t,n}^*)^{q_i}$$

where $s_{t,n}$ denotes the (t, n) tap before the iteration, $s'_{t,n}$ denotes the (t, n) tap after the iteration, I is a preselected integer greater than or equal to one, $a_i, i = 1, 2, \ldots I$ are preselected scalars that may vary from iteration to iteration, and $p_i$, $q_i, i=1, 2, \ldots I$ are preselected non-negative integers such that $p_i + q_i \geq 2$.

14. Apparatus according to Claim 13 wherein the unknown system combined with the equalizer behaves essentially as a linear shift invariant system whose taps are iteratively adjusted according to the following rule:

$$s_n' = \sum_{i=1}^{I} a_i s_n^{p_i} (s_n^*)^{q_i}$$

where $s_n$ denotes the $n^{th}$ tap before the iteration and $s'_n$ denotes the $n^{th}$ tap after the iteration.

15. Apparatus according to claim 14, wherein $I = 1$, such that $$s_n' = \alpha s_n^p (s_n^*)^q$$

where $\alpha$ is a scalar that may vary from iteration to iteration, and p and q are preselected non-negative integers such that $p + q \geq 2$.

16. Apparatus according to claim 15, wherein the equalizer is a linear shift invariant system whose taps are iteratively adjusted such that:

$$c' = \alpha R^{-1} d$$

where $c'$ is the column tensor whose $n^{th}$ element, $c'_n$ is the $n^{th}$ tap of the equalizer after the iteration, R is the tensor whose (n,m) element is:

$$R_{nm} = \text{cum}(y_{t-m}; y_{t-n}^*)$$

where $y_t$ is the input to the equalizer, and d is the column tensor whose $n^{th}$ element is:

$$d_n = \text{cum}(z_t; p; z_t^*; q; y_{t-n}^*)$$

where $z_t$ is the output of the equalizer given by:

$$z_t = \sum_n c_n y_{t-n}$$

where $c_n$ is the $n^{th}$ tap of the equalizer before the iteration, and the subscripts n and m belong to a pre-specified set.

17. Apparatus according to claim 16 wherein the elements of d are computed as follows:

$$d_n = \sum_{k_1} \sum_{k_2} \ldots \sum_{k_p} \sum_{k_{p+1}} \sum_{k_{p+2}} \ldots$$
$$\sum_{k_{p+q}} c_{k_1} c_{k_2} \ldots c_{k_p} c_{k_{p+1}}^* c_{k_{p+2}}^* \ldots c_{k_{p+q}}^* \text{cum}(y_{t-k_1}; y_{t-k_2}; \ldots$$
$$y_{t-k_p}; y_{t-k_{p+1}}^*; y_{t-k_{p+2}}^*; \ldots y_{t-k_{p+q}}^*; y_{t-n}^*)$$

18. Apparatus according to claim 15 wherein the equalizer is a linear shift invariant system whose transfer function is iteratively adjusted such that:

$$C'(w) = \alpha \frac{S_a^{1,0}(w)}{S_y^{1,0}(w)} \sum_{w_1} \sum_{w_2} \ldots$$
$$\sum_{w_{p+q-1}} \frac{S_y^{p,q}(-w_1, -w_2, \ldots -w_{p+q-1}, w)}{S_a^{p,q}(-w_1, -w_2, \ldots, -w_{p+q-1}, w)} \cdot$$
$$\left[\prod_{i=1}^{p-1} C(w_i)\right]\left[\prod_{i=p}^{p+q-1} C^*(-w_i)\right] C\left(w - \sum_{i=1}^{p+q-1} w_i\right)$$

where $C'(w)$ is the transfer function of the equalizer after the iteration, $C(w)$ is the transfer function of the equalizer before the iteration, $S_y^{1,0}(w)$ is the (1,0)-order spectrum (power spectrum) of $y_t$, $S_y^{p,q}(w_1, w_2, \ldots, w_{p+q})$ is the (p,q)-order spectrum of $y_t$ where p and q are preselected non-negative integers such that $p + q \geq 2$, $S_a^{1,0}(w)$ and $S_a^{p,q}(w_1, w_2, \ldots, w_{p+q})$ are preselected functions, and where w and $w_1, w_2, \ldots w_{p+q-1}$ belong to a prespecified set of frequencies.

19. Apparatus according to claim 15 wherein $\alpha$ is selected at some iterations such that $$\text{cum}(z_t; z_t^*) = \eta_t$$

where $z_t$ is the output of the equalizer and $\eta_t$ is preselected.

* * * * *